United States Patent
Giraud et al.

(10) Patent No.: US 9,497,260 B2
(45) Date of Patent: Nov. 15, 2016

(54) COMMUNICATION BETWEEN TWO WEB APPLICATIONS

(75) Inventors: Jérôme Giraud, Caen (FR); Mathieu Heliot, Caen (FR)

(73) Assignee: Orange, Paris (FR)

( * ) Notice: Subject to any disclaimer, the term of this patent is extended or adjusted under 35 U.S.C. 154(b) by 374 days.

(21) Appl. No.: 13/885,755

(22) PCT Filed: Nov. 21, 2011

(86) PCT No.: PCT/FR2011/052716
§ 371 (c)(1),
(2), (4) Date: May 16, 2013

(87) PCT Pub. No.: WO2012/069748
PCT Pub. Date: May 31, 2012

(65) Prior Publication Data
US 2013/0238695 A1  Sep. 12, 2013

(30) Foreign Application Priority Data

Nov. 23, 2010 (FR) ..................................... 10 59655

(51) Int. Cl.
*G06F 15/16* (2006.01)
*H04L 29/08* (2006.01)
(Continued)

(52) U.S. Cl.
CPC ................. *H04L 67/10* (2013.01); *G06F 9/52* (2013.01); *G06F 9/544* (2013.01); *G06F 17/30861* (2013.01); *H04L 67/02* (2013.01); *H04L 67/34* (2013.01)

(58) Field of Classification Search
CPC ....... H04L 67/10; H04L 67/42; H04L 67/02; G06Q 20/06; G06F 9/52; G06F 9/544; G06F 17/30861
USPC ....... 709/201, 202, 203, 216, 217, 223, 224, 709/225, 22, 226, 227
See application file for complete search history.

(56) References Cited

U.S. PATENT DOCUMENTS 8,438,289 B1 * 5/2013 Grieve et al. ................. 709/227
2003/0061395 A1  3/2003 Kingsbury et al.
(Continued)

FOREIGN PATENT DOCUMENTS

CN         101610195 A    12/2009
WO    WO 2008/152296 A1  12/2008
(Continued)

OTHER PUBLICATIONS

Ostrovsky, Igor. "What Really Happens When You Navigate to a URL." Igor Ostrovsky Blogging. N.p., Mar. 5, 2010. Web. May 1, 2015. <http://igoro.com/archive/what-really-happens-when-you-navigate-to-a-url/>.*

Primary Examiner — Liangche A Wang
Assistant Examiner — Kaylee Huang
(74) Attorney, Agent, or Firm — Drinker Biddle & Reath LLP (57) ABSTRACT

A method for communication between a first web application associated with a first browsing domain and a second web application associated with a second browsing domain. The browser-implemented applications record data from a browser software module and prohibit access to data recorded for selective browsing domains. The browser concurrently displays at least two sub-pages of an initial web page, a first sub-page being used for displaying a user interface for the first web application, a second sub-page being used for displaying a user interface for the second web application being executed independently of the first web application. A first software module of the first web application stores data in a database which is read by a second software module of the second web application, the first and second software modules being associated with a third browsing domain.

12 Claims, 5 Drawing Sheets

(51) Int. Cl.
*G06F 9/52* (2006.01)
*G06F 9/54* (2006.01)
*G06F 17/30* (2006.01)

(56) References Cited

U.S. PATENT DOCUMENTS

| | | |
|---|---|---|
| 2007/0299857 A1 | 12/2007 | Gwozdz et al. |
| 2008/0086477 A1* | 4/2008 | Hawkins ........... G06F 17/30902 |
| 2009/0037517 A1 | 2/2009 | Frei |
| 2009/0063613 A1* | 3/2009 | Chijiiwa et al. ............... 709/202 |
| 2009/0083860 A1* | 3/2009 | Nathan et al. ................... 726/28 |
| 2009/0299862 A1 | 12/2009 | Fan et al. |
| 2009/0327421 A1* | 12/2009 | Fu et al. ......................... 709/204 |
| 2010/0118038 A1* | 5/2010 | Labour et al. ................. 345/522 |
| 2010/0169895 A1 | 7/2010 | Dice et al. |

FOREIGN PATENT DOCUMENTS

| | | |
|---|---|---|
| WO | WO 2009/018375 A1 | 2/2009 |
| WO | WO 2009/029404 A2 | 3/2009 |

\* cited by examiner

COMMUNICATION BETWEEN TWO WEB APPLICATIONS

CROSS-REFERENCE TO RELATED APPLICATIONS

This application is the U.S. national phase of the International Patent Application No. PCT/FR2011/052716 filed Nov. 21, 2011, which claims the benefit of French Application No. 1059655 filed Nov. 23, 2010, the entire content of which is incorporated herein by reference.

FIELD

The present invention generally relates to the communication of data between software modules and, more particularly, to the exchange of data between web applications loaded into the same browser.

BACKGROUND

At the present time, many services are made available to a user via web applications, whose pages are accessible by means of a browser. However, it would be particularly advantageous to efficiently share information, specific to the user, between the pages of several web applications, notably when the latter are hosted under various domains. A web page belonging to the domain "www.abc.fr" could thus usefully exploit, for example by displaying it in a suitable form, a part of the data, specific to a user, collected by another web page belonging to the domain "www.def.net".

Typically, such a communication of data between web pages can only be implemented by sharing the access to common databases. This approach is not however satisfactory notably when the pages are hosted under various domains and are used by various actors. This is because a third-party entity must then intervene, notably posing problems of performance, configuration, security and adaptability.

A need therefore exists for sharing data between the web pages of a plurality of web applications, notably when the latter belong to various domains, without resorting to a remote entity, in other words located outside of the computer used to access said web pages.

The present invention aims to improve the situation.

SUMMARY

According to a first aspect, a method is provided for communicating between a first web application associated with a first browsing domain and a second web application associated with a second browsing domain, the first and second applications being implemented within a browser accessing a database, designed for recording data supplied by a software module loaded into said browser and to prohibit access to the data recorded for a software module associated with a browsing domain to any software module loaded into the browser which is not associated with said browsing domain, the method comprising:

a step for loading and for displaying concurrently at least two sub-pages of an initial web page, a first sub-page being used for displaying a user interface of the first web application, a second sub-page being used for displaying a user interface of the second web application being executed independently of the first web application, a step for storing data, by a first software module of the first web application, in said data base;

a step for reading, by a second software module of the second web application, data written in said database by the first software module, the first and second software modules being associated with a third browsing domain.

The browser disposes of a secure local storage mode, since access to the data stored in the local database is only authorized for the modules associated with the same domain as the module which carried out the recording of said data. Such a local storage mode is notably provided in the web browsers supporting the HTML5 standard described in the document "HTML5—A vocabulary and associated APIs for HTML and XHTML", W3C Working Draft, 4 Mar. 2010.

The first application, which is associated with a first browsing domain, cannot therefore record in the database a set of data in such a manner for the latter to be accessible to the second application associated with a second domain, when the latter is different from the first domain. It is for this reason that the first application uses, for recording data in the local database, a first software module associated with a third domain, as does the second software module used by the second application.

Thus, the data recorded by the first software module can be shared in complete security between the first module and the second module, via the local database. The sharing of this data does not therefore require the use of a third-party entity outside of the browser. Moreover, since the data set is stored locally, no exchange of data, costly in terms of time and bandwidth, is needed. Furthermore, the method can be implemented using the inherent functionalities offered by the browser.

Furthermore, since the two sub-pages are displayed concurrently, it is possible to transfer data from one web domain to another or from one website to another, while at the same time allowing the user to display the result of the transfer operation or else to interact at will and at any time on one or on the other page according to needs.

The invention considerably simplifies for the user the transfers of data from one page to another. It allows a multitude of services, games, etc. to be run in which data must be transferred from one page to another.

According to a first embodiment of the method according to the invention, the browser dynamically loads the first, respectively second, software module owing to the presence in the first, respectively second, web sub-page of a first, respectively second, reference to the third browsing domain. The sharing of information between the web applications is possible by virtue of the presence of these references. This sharing can therefore be implemented in a simple manner, for example during the design of the web page concerned.

According to a second embodiment of the method according to the invention, a software module of the first, respectively second, application inserts the first, respectively second, reference into the first, respectively second, web sub-page.

According to an alternative embodiment to this second embodiment, the first, respectively second, reference is present in the first, respectively second, web sub-page such as initially loaded by the browser.

Various modes of insertion of the first, respectively second, reference are possible: static insertion into the page such as designed or else dynamic insertion by a software package associated with the targeted web application.

According to another embodiment of the method according to the invention, the first, respectively second, reference is a reference to a first respectively second, web sub-page, containing the code of the first, respectively second, software module, where this first, respectively second, web sub-page is to be loaded then interpreted by the browser. The invention is implemented simply by using sub-page referencing web technologies within a page and dynamic loading of the web sub-pages thus referenced.

According to another embodiment of the method according to the invention, all or part of the data recorded by the first software module in said database is extracted from data displayed in the first sub-page. According to another embodiment of the method according to the invention, all or part of the data read by the second software module in said database is displayed in the second sub-page. The choice of the data to be transferred and/or read is free, which makes the invention adaptable to any type of web applications and allows the quantity of data to be transferred to be optimized by limiting it to what is really necessary.

According to another embodiment of the method according to the invention, the first sub-page is intended to be used by a first user and the second sub-page is intended to be used by a second user, different from the first user, the first, respectively second, sub-page comprising a user interface for inputting identification and/or authentication data for the first, respectively second, user.

The invention may be used to implement multi-user interfaces in which several users are able to access data in parallel which are specific to them after having been identified/authenticated, then to share all or part of the data which they access after identification/authentication. The number of web applications that the browser is able to implement is not limited, other than by the display and/or processing capacities of the browser: the invention is therefore applicable to sharing personal data between two or more users.

According to another embodiment of the method according to the invention, the second software module consults the database in order to detect in it the presence of data recorded by the first software module, to be read by the second software module.

According to another embodiment, the method according to the invention furthermore comprises a step for reading, by the first software module, data written into said database by the second software module.

According to another embodiment of the method according to the invention, the first software module consults the database in order to detect in it the presence of data recorded by the second software module, to be read by the first software module.

The two web applications communicate with each other via the database, including for the synchronization of the accesses to the database.

The various aforementioned embodiments may be combined with each other for the implementation of the invention. The detailed description illustrates one exemplary embodiment where these characteristics are combined.

The invention also relates to a browsing device for the implementation of a first web application associated with a first browsing domain and of a second web application associated with a second browsing domain, the browsing device accessing a database, designed for recording data supplied by a software module loaded into said browser and to prohibit access to the data recorded for a software module associated with a browsing domain to any software module loaded into the browser which is not associated with said browsing domain, the browsing device comprising:

means for loading and for displaying concurrently at least two sub-pages of an initial web page, a first sub-page being used for displaying a user interface of the first web application, a second sub-page being used for displaying a user interface of the second web application being executed independently of the first web application, means for executing a first software module of the first web application, designed for storing data in said database;

means for executing a second software module of the second web application, designed for reading data written into said database by the first software module, the first and second software modules being associated with a third browsing domain.

The advantages mentioned for the method according to the invention are directly transposable to the device according to the invention.

In one embodiment, the various steps of the method according to the invention are implemented by program instructions which are executed by a browsing device, designed for web browsing via a private local area network (Intranet network) or public wide area network (typically the Internet).

Consequently, another aim of the invention is a computer program on an information medium, this program being able to be executed by a data processor and to be implemented in a terminal or, more generally, in a computer, these programs respectively comprising instructions for implementing the steps of the method which has just been described.

This program can use any given programming language, and may take the form of source code, object code, or code intermediate between source code and object code, such as in a partially compiled form, or may take any other desired form.

The invention is also aimed at an information medium readable by a computer, and comprising instructions of a computer program such as mentioned hereinabove. The information medium may be any given entity or physical device capable of storing such a program.

BRIEF DESCRIPTION OF THE DRAWINGS

Other aspects, aims and advantages of the invention will become apparent upon reading the description of one of its embodiments.

The invention will also be better understood with the aid of the drawings, in which.

DETAILED DESCRIPTION

Terminal 1

Figure 1:
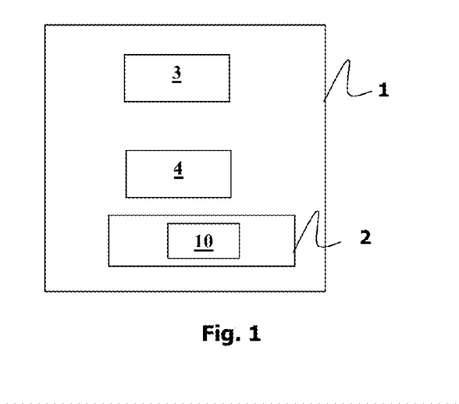
FIG. 1 is a schematic representation of a terminal according to the invention.

In the present description, and as illustrated in FIG. 1, a terminal 1 is considered that comprises a processing unit 2 and a user interface 3. The terminal 1 comprises a unit for accessing a network 4. The processing unit 2 comprises calculation and storage means for implementing a software environment 10. The software environment 10 is typically composed of a "firmware", of a "boot loader", of an operating system comprising software components. By way of non-limiting example, the operating system may be an operating system for a mobile terminal. The user interface 3 allows the user to interact with the terminal 1. The unit for accessing a network 4 allows for example the terminal 1 to access the Internet via various communications networks, such as for example a mobile telephony network, a data processing network, or a satellite communications network. The terminal 1 is for example a portable mobile device such as a mobile telephone or else a fixed or mobile personal computer.

Browser 20

The software environment 10 is designed to execute a browser 20 for web browsing over a network of the Internet or Intranet type. The function of the browser 20 is notably to allow a user to access a set of web pages defined for an application and to interact with this application by means of the web pages displayed in the browser 20.

More precisely, the browser 20 allows web pages implementing a web application to be downloaded, these pages belonging to a browsing domain and being supplied by a server for management of the browsing domain in question. For this purpose, the browser 20 comprises at least one software client capable of sending a request conforming to the protocol HTTP (HyperText Transfer Protocol) to a remote server and receiving in return the corresponding web page.

In a known manner, the web pages are described for example in HyperText Markup Language (or HTML). Page formatting data, known as style sheets, usually coded in the CSS (Cascading Style Sheet) format, are attached to this page coded in HTML. The web page furthermore contains or is transmitted with a program code (script), coded for example in Javascript language, designed to be interpreted and executed by the browser when the web page is loaded. Henceforth, the term "software module" will also be used for this program code associated with a web page and implementing a web application.

The browser 20 thus comprises an execution engine for interpreting the HTML code of a web page and the associated program codes, in order to execute the functions defined by these program codes, then to generate a web page able to be displayed in the browser, configured according to the associated formatting data, and finally to display the resulting page in a user interface of the browser.

The notion of browsing domain is to be interpreted in the wider sense: this means a web domain or pages having the same domain name. For example, all the pages whose URL contains www.xxxx.com and/or bbb.xxxx.com, where "xxxx.com" represents the name of the domain concerned.

Database 40

The local database 40 is specific to the browser 20. It is designed to store data in a permanent manner within the terminal. In particular, the local database 40 implements an interface according to the specification of the W3C entitled "Web Storage", notably in its "Editor's Draft" version of the 14 Apr. 2010.

This database is local in that all the data that it contains are stored locally in the terminal 1, and the access to these data does not require making a request to any physical equipment separate from the terminal 1.

The local database 40 is configured for:
allowing any software module loaded into the browser 20 to record data;
authorizing the access to the data recorded by one or more modules associated with a browsing domain, only to a module loaded into the browser also associated with the same browsing domain.

This local database is therefore designed for recording data supplied by a software module loaded into the browser and to prohibit access to the data recorded by a software module associated with a browsing domain to any software module loaded into the browser which is not associated with this same browsing domain. This database thus carries out a partitioning between the data managed for the web applications of a browsing domain and those managed for the web applications of another browsing domain.

Thus, a data value stored locally accordingly corresponds to a data value directly accessible by the browser 20, without the intervention of either a remote entity outside of the software environment 10 such as a remote web server, or of an entity executed within the software environment 10 but supported by processes not initiated by the browser 20, such as a database server executed in the software environment in a process not belonging to the browser 20.

In the following part of the description, the references to the HTML language relate to the HTML5 language specified, at least in part, in the document "HTML5—A vocabulary and associated APIs for HTML and XHTML", W3C Working Draft, 4 Mar. 2010 and to the later versions of this language.

This document notably defines the notion of "browsing context" as being an environment in which a document is presented to the user. For example, each window or each thumbnail of a browser presents a browsing context to the user and is used to present a succession of documents or web pages to this user.

Display of the Web Sub-Pages

Figure 2:
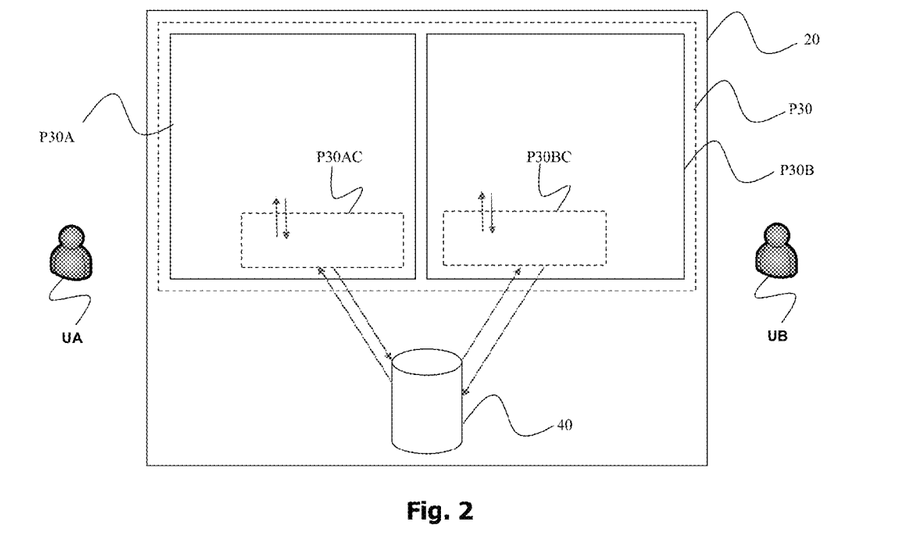
FIG. 2 shows schematically a browser in one embodiment of the invention.

The FIG. 2 shows schematically the constitution of a user interface presented by the browser 20 during the implementation of the method according to the invention. As illustrated in FIG. 2, the browser 20 downloads an initial web page P30 and displays this initial page in a window F30 of a user interface of the browser, this window showing two browsing contexts:
a first browsing context, corresponding to a first sub-window F30A of the window F30, comprising a first web sub-page P30A with which a user of the terminal 1 is able to interact;
a second browsing context, corresponding to a second sub-window F30B of the window F30, comprising a second web sub-page P30B with which a user of the terminal 1 is able to interact;
these two sub-windows F30A and F30B and their respective content being displayed simultaneously by the browser 20.

In the first browsing context, a first web application App30A, associated with a first browsing domain D30A, is executed whose user interface is displayed in the first sub-window F30A. Similarly, in the second browsing context, a second web application App30B, associated with a second browsing domain D30B, is executed whose user interface is displayed in the second sub-window F30B. The second browsing domain D30B is identical to or different from the first browsing domain D30A.

The first web application App30A is implemented by means of a software module S30A (Javascript, for example), loaded with the sub-page P30A associated with the first browsing domain. Similarly, the second web application App30A is implemented by means of a software module S30B (Javascript, for example), loaded with the sub-page P30B associated with the second browsing domain.

A user of the terminal 1 can interact on the sub-page P30A associated with the first application App30A and cause modifications of the sub-window F30A: modification of the appearance and/or of the content of the sub-page P30A or loading of another sub-page into this same sub-window F30A. This same user, or another user of the terminal 1, can interact on the sub-page P30B associated with the second application App30B and cause modifications of the sub-window F30B: modification of the appearance and/or of the content of the sub-page P30B or loading of another sub-page into this same sub-window F30B.

The management of these two browsing contexts is carried out by inserting, for each browsing context, an HTML tag of the "iframe" type into the HTML code of the initial web page, such as defined in the HTML5 standard, containing at least one identification of a web page ("src" attribute in the HTML5 standard), in the form for example of a URL, pointing to the browsing domain associated with this browsing context (to the first browsing domain D30A for the first browsing context, to the second browsing domain D30B for the second browsing context).

Such a reference is used to instantiate a browsing sub-context: its presence in the HTML code of a web page causes the browser 20 to send an HTTP request (FIG. 4B) to the server for management of the browsing domain identified by this reference and the loading by the browser 20 of a web page belonging to this domain, in this case the page identified by the URL defined by this reference. L Such a reference is coded in XML, for example in the following form:

<iframe src="www.a.fr/page1"></iframe> where:

"www.a.fr" identifies the browsing domain associated with the reference,

"www.a.fr/page1" being the URL of the web page to be downloaded.

Such a reference is thus used to incorporate by reference a web sub-page into another web page.

The data of the web sub-page P30A or P30B which are loaded by the browser 20 in response to the HTTP request comprise HTML code, formatting data (CSS) and a software module (a program code or script, coded for example in Javascript). For the first sub-page P30A, the software module downloaded with the HTML code for the sub-page P30A is denoted S30A, which is used to implement the first web application App30A. Similarly, for the second sub-page P30B, the software module and downloaded with the HTML code for the sub-page P30B is denoted S30B, which is used to implement the second web application App30B. Each of these software modules S30A and S30B is loaded into memory, interpreted and executed by the browser 20 and the sub-pages P30A and 030B are displayed in the user interface of the browser according to what is shown in FIG. 2.

Communication Between the Web Applications App30A and App30B

The first web application App30A is capable of communicating with the second web application App30B in that the first web application is implemented by means of a software module S30AC which is associated with the same browsing domain (in this case a third browsing domain D30C) as a software module S30BC implementing the second web application: the presence of a browsing domain that is common to these two software modules S30A, S30B allows these two modules to share data stored by any one of these two modules in the local database.

Each of these two software modules S30AC, S30BC can therefore access the data recorded by the other in this local database and extract a part or the entirety of these data.

For this purpose, the data recorded in the database by any one of these two modules, comprise, for each piece of information/parameter to be shared, an identification of the information concerned and of the data representing this information or this parameter. For example, if the two software modules have to share information which is a telephone number, an identification of this information will be stored in memory (for example "PhoneNumber") in association with a telephone number (for example "0123456789"). In practice, each software module which accesses the database is free to create the desired storage tables: indicating, for each storage table, a list of at least one data field, each defined by a name and a data type (number, text, etc.) and which allows data of this type to be stored.

It may be envisioned for the two software modules S30AC, S30BC to share any type of content, for example images, videos or audio content or, more generally, data. It may also be envisioned for the shared data to be program code that can be interpreted and/or executed by the browser.

These two software modules S30AC, S30BC are used in the following manner. For each web sub-page P30A, P30B a browsing sub-context is defined, by inserting into the HTML code for this web sub-page P30A, P30B a reference to the third browsing domain D30C, this time again in the form of XML tag of the "iframe" type, containing at least one identification for a web page ("src" attribute in the HTML5 standard), in the form for example of a URL, pointing toward the third browsing domain D30C and identifying a sub-page P30AC (respectively P30BC) of the sub-page P30A (respectively P30B) to be downloaded.

It should be noted that the sub-page P30AC or P30BC does not necessarily comprise information to be presented to the user, and may not therefore lead to a modification of the sub-page P30A or P30B to which it is attached. Indeed, in this case, the presentation to the user of the browser of the sub-page P30A or P30B is not modified by the presence of the "iframe" reference and hence is invisible to this user. Conversely, it could be provided for the presentation of the sub-page P30A or P30B to be modified, for example by addition of a logo or other sign, indicating the possibility of transmitting data contained in this sub-page P30A or P30B to another web page.

According to a first alternative embodiment, the sub-page P30A (respectively P30B), such as downloaded by the browser, contains the reference ("iframe") to the third browsing domain D30C and to the sub-page P30AC (respectively P30BC).

According to a second alternative embodiment, during its execution by the browser 20, the software module S30A dynamically inserts into the sub-page P30A (respectively P30B) the reference ("iframe") to the third browsing domain D30C and to the sub-page P30AC (respectively P30BC). Following this insertion, the sub-page P30A (respectively P30B) therefore contains this reference, which causes the browser 20 to load the sub-page P30AC (respectively P30BC).

The exchange of data between the software applications App30A and App30B (between the sub-page P30A and the sub-page P30B) may be unidirectional (from App30A to App30B, or vice versa) or bidirectional.

For the transfer of data from the software application App30A to the software application App30B, the sub-page P30A comprises a set of data DC to be saved locally in the local database and to be transmitted to the sub-page P30B via this local database. Conversely, for the transfer of data from the software application App30B to the software application App30A, the sub-page P30B comprises, as displayed in the user interface of the browser, a set of data DC to be saved locally in the local database and to be transmitted to the sub-page P30A via this local database.

The transferred data can be data integrated into the HTML page as received by the browser and/or data having been input into this first page by a user. The data may also be invisible to the user of the browser, which data are stored in the memory of the browser or coded into the HTML page, without being displayed in the interface of the browser.

The data recorded in the database 40 are recorded for example in the form of a message to be read by an application. A message is used here to define a set of data, that are linked together, to be read by an application.

Synchronization of the Read and Storing Operations

The execution of each of these two applications is independent of the other, in that these are two separate processes. As described hereinabove, these two processes can however communicate between them: the only link between these two applications is established through the local database which they use as a shared storage area.

Consequently, one may be used for access to a website different from the website to which the other web application allows access. These web applications may also be used by two users having separate user accounts for accessing the same website or different websites.

Various modes of synchronization between these web applications may be implemented, for access to this shared storage area.

In one embodiment, each web application (App30A or App30B), having stored, in the database 40, data to be read by another web application, records synchronization information in the database 40 in order to inform the other web application of the presence of data to be read, newly stored in this database. This other software application is designed for consulting the local database 40, for example periodically, in order to detect in it the presence of such synchronization information indicating the presence of recorded data to be read, and, in the case of detection, to carry out the reading of this data.

Furthermore, each web application (App30A or App30B), having read in the database 40 data having been recorded by another web application, records synchronization information in the database in order to inform the other web application that the read operation has been carried out: this prevents the web application having stored this data from deleting or replacing this data before the other has had the time to read it.

Single-Site Multi-User Mode

In a first embodiment, known as single-site multi-user mode, the first sub-page P30A is intended to be used by a first user UA and the second sub-page P30B is intended to be used by a second user UB, different from the first user. The first and second browsing domains D30A and D30B are assumed to be identical, as are the web applications App App30A and App30B, in other words they offer the same functionalities and implement the same service via the same website belonging to the common browsing domain D30A (identical to D30B).

One example of application of this embodiment is the exchange of data between two users UA and UB of the same social network: each of the users connects to the website of the social network in order to access his user account and to select the information to be shared with the other user. This embodiment is more generally applicable to the sharing of personal data between two or more users.

In this first embodiment, in order to guarantee that the two users UA and UB are indeed different from one another, the first sub-page P30A comprises a user interface for inputting identification and/or authentication data for the first user UA and the second sub-page P30B comprises a user interface for inputting identification and/or authentication data for the second user UB.

Figure 5A:
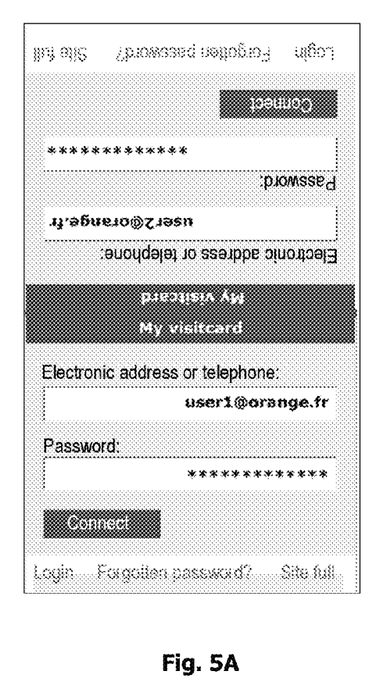
FIGS. 5A to 5C are examples of user interfaces usable for the implementation of the invention.

One example of such a user interface is shown in FIG. 5A: a sub-page P30A, which has been subject to a rotation of 180°, is displayed top-to-tail opposite a page P30B. Each sub-page contains an input form for authentication data.

The identification and/or authentication data input into the sub-page P30A by the first user UA, together with those input into the sub-page P30B by the second user UA, are transmitted to an identification/authentication server controlling the access to the browsing domain D30A (identical to the domain D30B) before authorizing these users to use the web application App30A or App30B of the sub-page P30A or P30B concerned.

If the user UA has the necessary authorizations, the sub-page P30A displayed subsequent to the authorization for connection to the targeted website can show information specific to the user UA (his surname, first name, identifier, etc.) to signify to this user that he is identified and that he is accessing, via the web application App30A, a user account specific to him. Similarly, if the user UB has the necessary authorizations, the sub-page P30B displayed subsequent to the authorization for connection to the targeted website can show information specific to the user UB (his surname, first name, identifier, etc.) to signify to this user that he is identified and that he is accessing, via the web application Bpp30B, a user account specific to him.

Figure 5B:
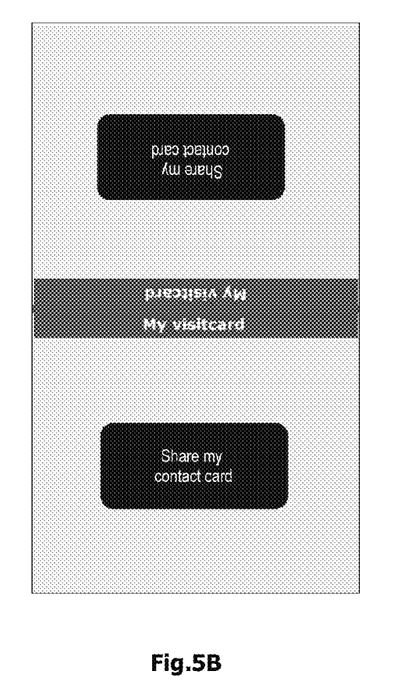
Figure 5C:
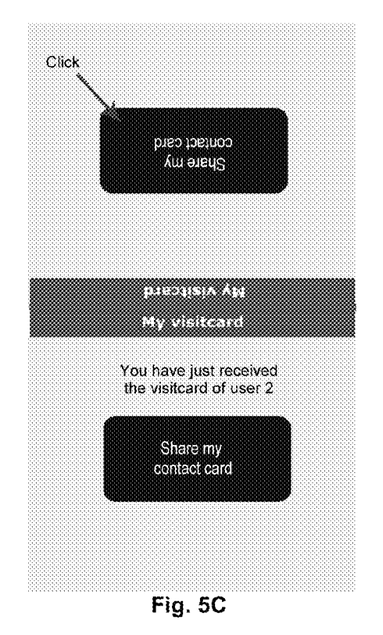

In the case of the example described, after access authorization, the sub-pages P30A and P30B appear as shown in FIG. 5B: each user has access to a web application App30A or App30B for contact card sharing and can click the interface element, in the form of a clickable button, called "share my contact card". If the user UA clicks the button of the sub-page P30A, the sub-pages P30A and P30B appear as shown in FIG. 5C: an information message is displayed in the sub-page P30B ("you have just received the contact card of user2") in order to indicate the successful execution of a transfer of data.

Multi-Domain Multi-User Mode

In a second embodiment, known as multi-domain multi-user mode, the first sub-page P30A is intended to be used by a first user UA and the second sub-page P30B is intended to be used by a second user UB, different from the first user, the first and second browsing domains D30A and D30B also being different. Just as in the first embodiment, the first sub-page P30A comprises a user interface for inputting identification and/or authentication data for the first user UA and the second sub-page P30B comprises a user interface for inputting identification and/or authentication data for the second user UB.

The identification and/or authentication data input into the sub-page P30A by the first user UA, together with those input into the sub-page P30B by the second user UA, are transmitted to an identification/authentication server controlling the access to the browsing domain D30A or else D30B prior to authorizing these users to use the web application App30A or App30B of the sub-page P30A or P30B concerned. The rest of the operation is identical to that described for the single-site multi-user mode.

One example of application of this embodiment of the invention is the exchange of data between two users UA and UB of two different social networks: each of the users connects to the website of the social network to which he/she belongs in order to access his/her user account and to select the information to be shared with the other user.

This embodiment is applicable to the sharing of information between more than two separate web applications/websites: for this purpose, it suffices to initiate one web application per site and to insert into a web sub-page, serving as a user interface for a web application, a reference to a browsing domain common to all the web applications concerned by the sharing of information.

Multi-Domain Single-User Mode

In a third embodiment, known as multi-domain single-user mode, the first sub-page P30A is intended to be used by a first user UA and the second sub-page P30B is intended to be used by the same user UB (identical to UA), but the first and second browsing domains D30A and D30B are different, with the consequence that this user must identify/authenticate himself both to a first identification/authentication server controlling the access to the first browsing domain D30A and also to a second identification/authentication server controlling the access to the second browsing domain D30B.

In this third embodiment, the first sub-page P30A comprises a user interface, as does the second sub-page P30B, for inputting identification and/or authentication data for the user UA (=UB). The identification/authentication data input into the first sub-page P30A or P30B are transmitted to an identification/authentication server prior to authorizing the user to use the web application App30A or App30B of the sub-page P30A or P30B concerned.

If the user UA has the necessary authorizations, the sub-page P30A displayed subsequent to the authorization for connection to the target website can show information specific to the user UA (his surname, first name, identifier, etc.) in order to signify to this user that he is identified and that he is accessing, via the web application App30A, a user account specific to him. Similarly, if the user UB has the necessary authorizations, the sub-page P30B displayed subsequent to the authorization for connection to the target website can show information specific to the user UB (his surname, first name, identifier, etc.) in order to signify to this user that he is identified and that he is accessing, via the web application Bpp30B, a user account specific to him.

One example of application of this embodiment of the invention is on-line payment, during which a user connects to a first website for on-line purchases in order to select the objects that he wishes to purchase/order, then connects to a second website of an on-line bank in order to obtain payment data, in the form for example of a virtual payment card number. The amount of the invoice to be paid is transferred from the first application App30A to the second application App30B, the latter processing the request for generation of a virtual payment card for the amount indicated and transferring the payment data to the first application App30A so as to finalize the purchase.

Single-Domain Single-User Mode

In a fourth embodiment, known as single-domain single-user mode, the first sub-page P30A is intended to be used by a first user UAB and the second sub-page P30B is intended to be used by the same user UAB, and the first and second browsing domains D30A and D30B are also identical.

However, since the first and second applications are executed independently of each other, this user must identify/authenticate himself both to a first identification/authentication server controlling the access to the first browsing domain D30A and also to a second identification/authentication server controlling the access to the second browsing domain D30B.

It may however be envisioned for the user to input his/her identification/authentication data only once into one of the two sub-pages P30A or P30B loaded initially, and for these identification/authentication data to be transferred to the other sub-page via the local database 40, in accordance with the method according to the invention.

These four embodiments allow an automated copy/paste to be carried out operating on several fields of data. They furthermore allow transfers from one page to another of complex data such as images, video, audio content, etc., with the caveat of not exceeding the storage capacity of the database (10 Mbytes on average).

Method for Communication Between Two Web Applications

Figure 3:
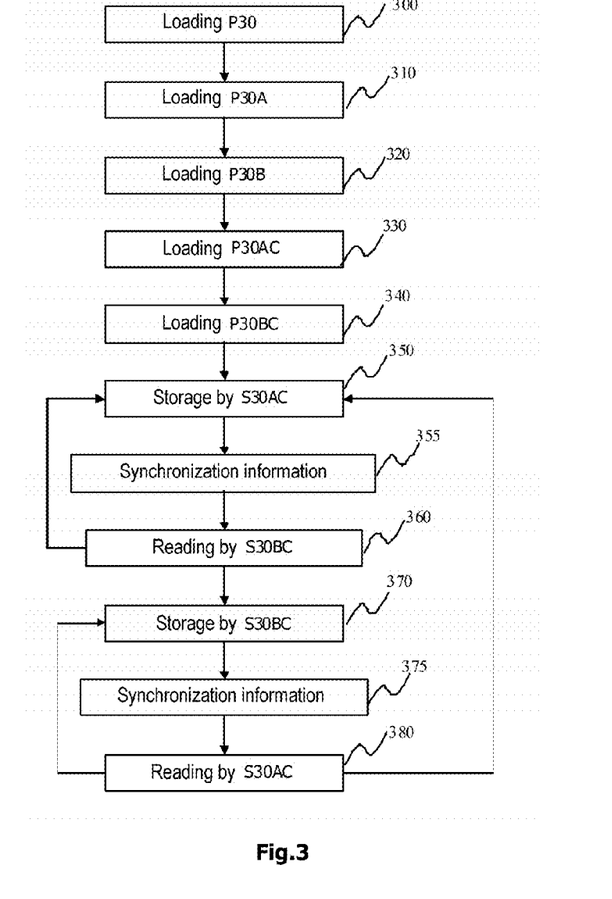
FIG. 3 is a flow diagram of one embodiment of a method of communication according to the invention.

One embodiment of the method according to the invention is described with reference to FIG. 3 and to FIGS. 4A to 4I.

Figure 4A:
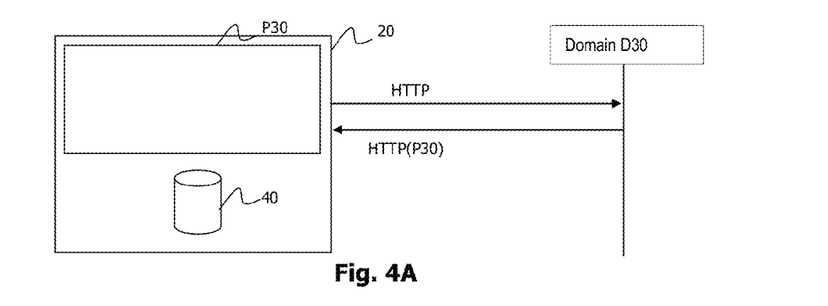
FIGS. 4A to 4I illustrate certain of the steps of the method according to the invention.

The method commences with a step 300 for sending an HTTP request to a web server for a domain D30, then for loading and for displaying an initial web page P30 received in response to this HTTP request (FIG. 4A). This initial web page P30 is displayed in a window F30 of a user interface of the browser 20. The HTML code of the page P30 loaded comprises a first reference to a first browsing domain D30A and a first sub-page P30A, together with a second reference to a second browsing domain and a second sub-page P30B.

Figure 4B:
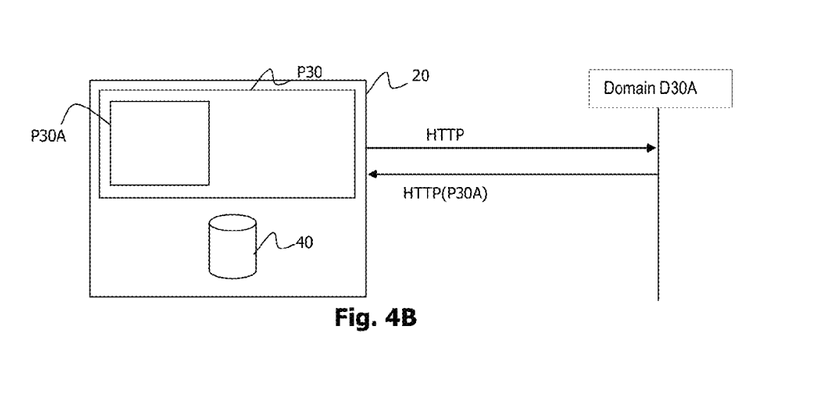

Owing to the presence of the first reference in the page P30, the method proceeds with a step 310 for sending a HTTP request to a web server of a first browsing domain D30A and for receiving in reply a first sub-page P30A and an associated software module S30A, in the form of a script (FIG. 4B). This first sub-page P30A is decoded, interpreted and displayed in the user interface of the browser 20, in a sub-window F30A of the window F30. The software module S30A is loaded into the memory of the browser, interpreted then executed by the browser 20.

This first sub-page is used for displaying a user interface of a first web application App30A of the first browsing domain D30A. The HTML code for this first sub-page P30A, such as received by the browser 20, comprises a third reference to a third browsing domain D30C and to a sub-page P30AC. As an alternative, as described hereinabove, this third reference is inserted dynamically into the HTML code for the sub-page P30A by the software module S30A loaded with this same sub-page P30A.

Figure 4C:
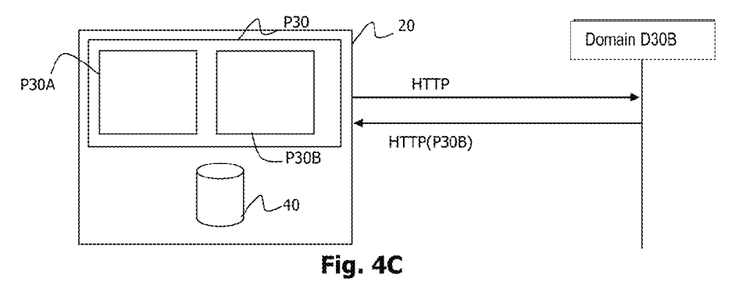

Owing to the presence of the second reference in the page P30, the method proceeds with a step 320 for sending an HTTP request to a web server of a second browsing domain D30B (identical to or different from the first browsing domain) and for receiving in reply a second sub-page P30B and an associated software module S30B, in the form of a script (FIG. 4C). This second sub-page P30B is decoded, interpreted and displayed in the user interface of the browser 20, in a sub-window F30B of the window F30. The software module S30B is loaded into the memory of the browser, interpreted then executed by the browser 20.

This second sub-page is used for displaying a user interface of a second web application App30B of the second browsing domain D30B. The HTML code for this second sub-page P30B, such as received by the browser 20, comprises a fourth reference to the third browsing domain D30C and to a sub-page P30BC. As an alternative, as described hereinabove, this fourth reference is inserted dynamically into the HTML code for the sub-page P30B by the software module S30B loaded with this same sub-page P30B.

Figure 4D:
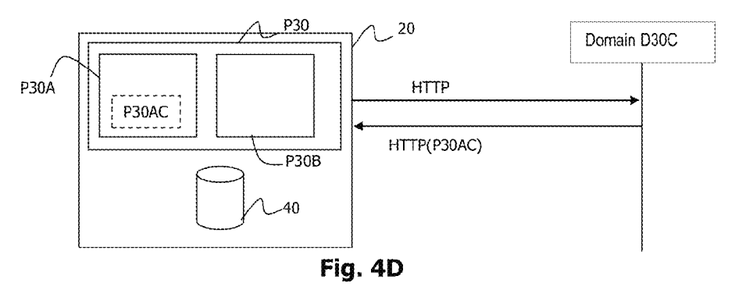

Owing to the presence of the third reference, the method proceeds with a step 330 for sending an HTTP request to a web server of the third browsing domain D30C and for receiving in reply a sub-page P30AC and an associated software module S30AC, in the form of a script (FIG. 4D).

This sub-page P30AC is decoded, interpreted and, where appropriate, displayed. In particular, the appearance of the sub-page P30A within the window F30A of the user interface of the browser 20 can be modified, for example by adding a logo or one or more additional interaction elements, allowing the user to trigger a function for transfer of data to the second web application App30B and/or for reading data coming from the second web application App30B. It is assumed here that the sub-page P30A comprises, initially or following the modifications applied by the sub-page P30AC, at least one such interaction element.

The software module S30AC received with the sub-page P30AC is also loaded, interpreted and executed by the browser 20. This software module S30AC is used, as is the software module S30A, for implementing the first web application App30A. The software modules S30A and S30AC can notably communicate with each other, by means of the HTTP protocol, for example when:
- the software module S30A transmits data to be stored in the local database to the software module S30AC; or
- the software module S30AC transmits data read in the local database to the software module S30A.

Figure 4E:
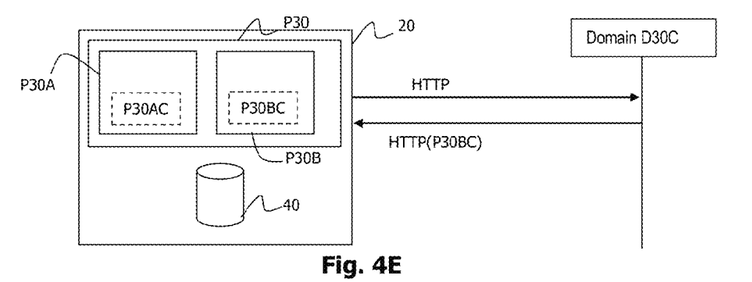

Owing to the presence of the fourth reference, the method proceeds with a step 340 for sending an HTTP request to a web server of the third browsing domain D30C and for receiving in reply a sub-page P30BC and an associated software module S30BC, in the form of a script (FIG. 4E).

This sub-page P30BC is decoded, interpreted and, where appropriate, displayed. In particular, the appearance of the sub-page P30B within the window F30B of the user interface of the browser 20 can be modified, for example by adding a logo or one or more additional interaction elements, allowing the user to trigger a function for transfer of data to the second web application App30A and/or for reading data coming from the second web application App30A. It is assumed here that the sub-page P30B comprises, initially or following the modifications applied by the sub-page P30BC, at least one such interaction element.

The software module S30BC received with the sub-page P30BC is also loaded, interpreted and executed by the browser 20. This software module S30BC is used, as is the software module S30B, for implementing the second web application App30B. The software modules S30B and S30BC can notably communicate with each other, by means of the HTTP protocol, for example when:
- the software module S30B transmits data to be stored in the local database to the software module S30BC; or
- the software module S30BC transmits data read in the local database to the software module S30B.

At this stage, a user can interact with the first sub-page P30A, in particular to look at and to read the information presented, to input new data, for example by means of forms, or to request the execution of certain tasks to the first web application App30A. In one particular embodiment, during a step 345 (not shown, optional) a user UA connects to a user account on a site of the first browsing domain D30A by means of this first web application App30A.

Another user (or the same user) can interact in the same way with the second sub-page P30B, in particular to look at and to read the information presented, to input new data, for example by means of forms, or to request the execution of certain tasks to the first web application App30B. In one particular embodiment, during a step 346 (not shown, optional) a user UB (identical to or different from UA) connects to a user account on a site of the second browsing domain D30B by means of this second web application App30B.

Figure 4F:
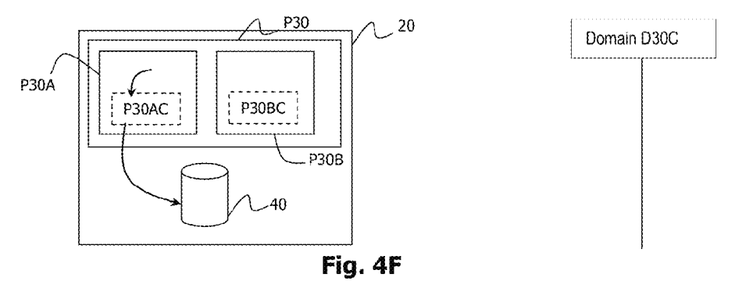

Subsequent to an action performed by a user on the sub-page P30A, for example by means of the aforementioned interaction element present in the sub-page P30A, the method proceeds with a step 350 for storing data, by the software module S30AC, in the local database (FIG. 4F).

Then, the software module S30AC records, in this local database, first synchronization information to inform the software module S30BC of the presence of data, newly stored in this database, to be read.

The data recorded by the software module S30AC in the database is for example extracted from data displayed in the sub-page P30A and/or extracted from data supplied by the software module S30AC or the software module S30A or by the browser 20 itself.

Figure 4G:
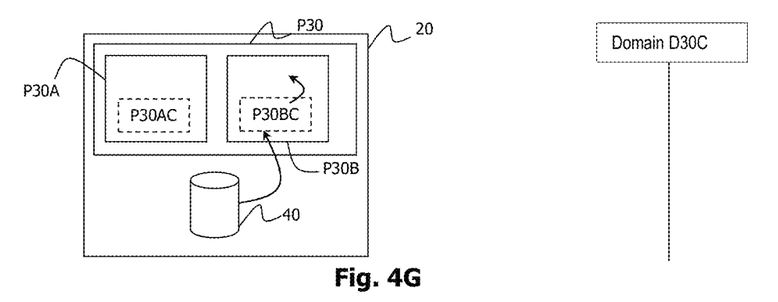

The method proceeds with a step 355 during which the software module S30BC consults the local database in order to detect in it the presence of the first synchronization information indicating the presence of data recorded by the software module S30AC, to be read by the software module S30BC.

Where such synchronization information is present, the method proceeds with a step 360 for reading in the local database, by the software module S30BC, data stored at the step 350 in this database by the software module S30AC (FIG. 4G). Then, the software module S30BC records, in this local database, second synchronization information for indicating to the software module S30AC that the read operation has been carried out.

The data read by the software module S30BC in the database are for example displayed in the sub-page P30B and/or transmitted for processing to the software module S30BC or to the software module S30B or to the browser 20 itself, this processing also being able to cause modifications in the display of the sub-page P30B.

Figure 4H:
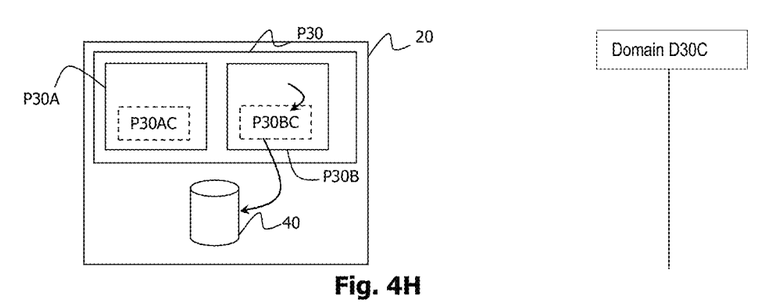

Subsequent to an action carried out by a user on the sub-page P30B, for example by means of an aforementioned interaction element present in the sub-page P30B, the method proceeds with a step 370 for storing data, by the software module S30BC, in the local database (FIG. 4H).

Then, the software module S30BC records in this local database third synchronization information for indicating to the software module S30AC the presence of data, newly stored in this database, to be read.

The data recorded by the software module S30BC in the database are for example extracted from data displayed in the sub-page P30B and/or extracted from data supplied by the software module S30BC or the software module S30B or by the browser 20 itself.

Figure 4I:
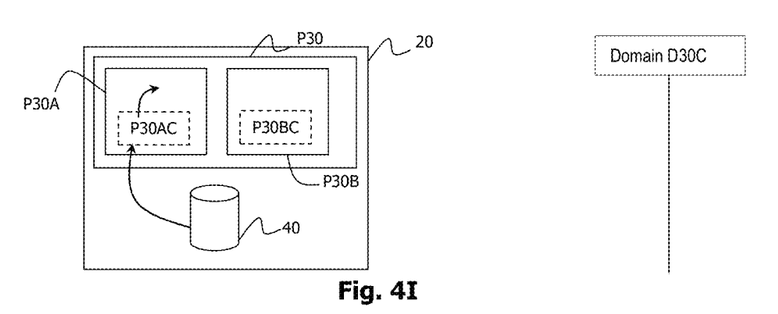

The method proceeds with a step 375 during which the software module S30AC consults the local database in order to detect in it the presence of the third synchronization information indicating the presence of data, recorded by the software module S30BC, to be read by the software module S30AC.

Where such synchronization information is present, the method proceeds with a step 380 for reading in the local database, by the software module S30AC, data written at the step 350 in this database by the software module S30BC (FIG. 4I). Then, the software module S30AC also records in this local database fourth synchronization information in order to inform the software module S30BC that the read operation has been carried out.

The steps for storing and/or reading in the database 40 can be repeated several times. In particular, subsequent to the read step 360, the steps 350 to 360 can be repeated in order to transfer other data from the first application App30A to the second application App30B. Similarly, subsequent to the read step 380, the steps 370 to 380 can be repeated in order to transfer other data from the second application App30B to the second application App30A. Lastly, subsequent to the step 380 for reading, the steps 350 to 380 can be repeated.

Furthermore, the step 355 or 375, during which the software module S30AC or S30BC consults the database 40 in order to detect in it the presence of synchronization information indicating the existence of data to be read by this software module, is repeated, preferably periodically, by the software module S30AC or S30BC throughout its execution, in such a manner that the latter quickly detects the existence of data to be read.

The invention is applicable to the implementation of various applications requiring a communication between two web applications. These web applications can communicate thanks to the invention by going via a local database, not requiring for its access to establish a connection over a network and forming a shared access storage area within the browser.

For the user, the invention simplifies considerably the transfers of information/of data from one page to another, whether or not these pages belong to different sites. The invention is also applicable to the transfer of data between two different users, whether or not they are connected to the same site, accessing the data to be shared via a user account specific to them.

The invention allows the implementation of a kind of "middleware", in other words a software bus for communication between applications, and a function of automated paperweight between two web applications.

The invention claimed is:

1. A method for communicating between a first web application associated with a first browsing domain and a second web application associated with a second browsing domain different from the first browsing domain, the method comprising:
    a step for loading and for displaying concurrently at least two sub-pages of a web page, a first sub-page being used for displaying a first user interface of the first web application, a second sub-page being used for displaying a second user interface of the second web application being executed independently of the first web application, the first and second web applications being implemented within a browser accessing a local database, said local database being specific to said browser and configured for recording data supplied by a database software module loaded into said browser and to prohibit access to the data stored for a particular software module associated with a particular browsing domain to any software module loaded into the browser which is not associated with said particular browsing domain,
    a step for storing data, by a first software module of the first web application, in said local database;
    a step for reading, by a second software module of the second web application, data written in said local database by the first software module, the first and second software modules being associated with a third browsing domain,
    wherein the browser dynamically loads the first, respectively second, software module owing to the presence in the first, respectively second, web sub-page of a first, respectively a second, reference to the third browsing domain.

2. The method as claimed in claim 1, wherein the respective software module of the first, respectively second, web application dynamically inserts the first, respectively second, reference into the first, respectively second, web sub-page.

3. The method as claimed in claim 1, wherein the first, respectively second, reference is present in the first, respectively second, web sub-page when said first, respectively second, web sub-page is initially loaded by the browser.

4. The method as claimed in claim 1, wherein the first, respectively second, reference is a reference to a first respectively second, web page, containing the code of the first, respectively second, software module, where this first, respectively second, web page will be loaded then interpreted by the browser.

5. The method as claimed in claim 1, wherein all or part of the data recorded by the first software module in said local database is extracted from data displayed in the first sub-page.

6. The method as claimed in claim 1, wherein all or part of the data read by the second software module in said local database is displayed in the second sub-page.

7. The method as claimed in claim 1, wherein the first sub-page is intended to be used by a first user and the second sub-page is intended to be used by a second user, different from the first user, the first, respectively second, sub-page comprising a user interface for inputting identification and/or authentication data for the first, respectively second, user.

8. The method as claimed in claim 1, wherein the second software module consults the local database in order to detect in said local database the presence of data recorded by the first software module, to be read by the second software module.

9. The method as claimed in claim 1, comprising a step for reading by the first software module data written in said local database by the second software module.

10. The method as claimed in claim 9, wherein the first software module consults the local database in order to detect in said local database the presence of data recorded by the second software module, to be read by the first software module.

11. A browsing device for the implementation of a first web application associated with a first browsing domain and of a second web application associated with a second browsing domain different from the first browsing domain, the browsing device comprising:
    means for loading and for displaying concurrently at least two sub-pages of an initial web page, a first sub-page being used for displaying a first user interface for the first web application, a second sub-page being used for displaying a second user interface for the second web application being executed independently of the first web application, the browsing device executing a browser accessing a local database, said local database being specific to said browser and configured for recording data supplied by a database software module loaded into said browser and to prohibit access to the data recorded for a particular software module associated with a particular browsing domain to any software module loaded into the browser which is not associated with said particular browsing domain,
    means for executing a first software module of the first web application, designed for storing data in said local database;
    means for executing a second software module of the second web application, designed for reading data written into said local database by the first software module, the first and second software modules being associated with a third browsing domain,
    wherein the browser dynamically loads the first, respectively second, software module owing to the presence in the first, respectively second, web sub-page of a first, respectively a second, reference to the third browsing domain.

12. A non-transitory computer program product on an information medium, comprising instructions for implementing the steps of the communication method as claimed in claim 1 when the program is executed by a data processor.

* * * * *